(12) United States Patent
Pruzan et al.

(10) Patent No.: US 8,746,699 B1
(45) Date of Patent: Jun. 10, 2014

(54) THREE-DIMENSIONAL ALPHANUMERIC PUZZLE GAME AND ITS ASSOCIATED METHOD OF PLAY

(71) Applicants: Alan Pruzan, Seattle, WA (US); Andrew Forrest, Seattle, WA (US); Jay Wheatley, Seattle, WA (US)

(72) Inventors: Alan Pruzan, Seattle, WA (US); Andrew Forrest, Seattle, WA (US); Jay Wheatley, Seattle, WA (US)

(73) Assignee: Forrest-Pruzan Creative LLC, Seattle, WA (US)

( * ) Notice: Subject to any disclaimer, the term of this patent is extended or adjusted under 35 U.S.C. 154(b) by 0 days.

(21) Appl. No.: 13/747,458

(22) Filed: Jan. 22, 2013

Related U.S. Application Data

(62) Division of application No. 12/759,666, filed on Apr. 13, 2010, now abandoned.

(51) Int. Cl.
  *A63F 9/08* (2006.01)
  *A63F 9/26* (2006.01)
  *G09B 1/36* (2006.01)

(52) U.S. Cl.
  USPC ....... 273/157 R; 273/156; 273/450; 434/171; 434/172

(58) Field of Classification Search
  USPC .................. 273/157 R, 156, 153 R, 449, 450; 434/159, 160, 161, 171, 172; 446/124, 446/125
  See application file for complete search history.

(56) References Cited

U.S. PATENT DOCUMENTS

| | | | | |
|---|---|---|---|---|
| 3,270,452 A | * | 9/1966 | D Elia et al. | 434/172 |
| 3,537,202 A | * | 11/1970 | Asmus et al. | 434/172 |
| 3,616,551 A | * | 11/1971 | Conrad | 434/171 |
| 3,822,487 A | * | 7/1974 | Koch | 434/172 |
| 3,863,918 A | * | 2/1975 | Kramer | 273/450 |
| 3,918,178 A | * | 11/1975 | Riley | 434/193 |
| 4,037,846 A | * | 7/1977 | Zeeman | 273/157 R |
| 4,293,128 A | * | 10/1981 | Ebel | 273/450 |
| 4,430,825 A | * | 2/1984 | Leboeuf | 446/101 |
| 4,532,579 A | * | 7/1985 | Merryman | 362/239 |
| 4,802,854 A | * | 2/1989 | Davis | 434/159 |
| 4,877,407 A | * | 10/1989 | du Pont et al. | 434/302 |
| D344,543 S | * | 2/1994 | Lemon | D19/59 |
| 5,554,062 A | * | 9/1996 | Goldsen | 446/124 |
| 5,581,922 A | * | 12/1996 | Heimann | 434/172 |
| 5,702,105 A | * | 12/1997 | Glikmann | 273/272 |
| 7,731,192 B1 | * | 6/2010 | Marhefka | 273/157 R |
| 7,832,732 B1 | * | 11/2010 | Torres et al. | 273/294 |
| 2008/0237991 A1 | * | 10/2008 | Paul et al. | 273/450 |

* cited by examiner

*Primary Examiner* — Steven Wong
(74) *Attorney, Agent, or Firm* — Lamorte & Associates P.C.

(57) ABSTRACT

A novelty game that utilizes a plurality of alphanumeric-shaped playing pieces. Each playing piece has a body shaped as a letter or number. The body has a flat face surface, a parallel rear surface, and side edges that interconnect the face surface to the rear surface. The width of the side edges is large enough to enable each playing piece to stand upright on-edge and unsupported. A plurality of mechanical connectors are present on the playing pieces. The connectors enable each playing piece to physically interconnect with at least two others of the playing pieces to form an assemblage of letters or numbers word. When a conjoined assemblage is formed, only one or some of the playing pieces touch the ground. Most are supported in the air as the playing pieces build atop one another.

17 Claims, 5 Drawing Sheets

US 8,746,699 B1

THREE-DIMENSIONAL ALPHANUMERIC PUZZLE GAME AND ITS ASSOCIATED METHOD OF PLAY

RELATED APPLICATIONS

This application is a divisional application of co-pending application Ser. No. 12/759,666 filed Apr. 13, 2010.

BACKGROUND OF THE INVENTION

1. Field of the Invention

In general, the present invention relates to three-dimensional puzzles and word creation games. More particularly, the present invention relates to puzzles and games that use letter-shaped pieces to form words.

2. Prior Art Description

Wooden blocks with alphabet letters carved into their surfaces have been in existence for hundreds of years. Using such blocks, the alphabet can be taught to children. Furthermore, by placing various blocks together, children can be taught to spell words.

Although blocks can be placed next to each other and atop one another, traditional wooden blocks do not mechanically interconnect. Accordingly, words can only be formed by positioning the blocks horizontally next to each other or stacking the blocks vertically atop one another.

Many games, such as Scrabble®, use alphabetic tiles to create words. However, since the tiles are flat, the tiles can only spell words if they are placed next to each other on a flat surface. Similarly, letters of the alphabet have been printed on flat interconnecting puzzle pieces. Although the puzzle pieces may interconnect, the puzzle pieces can only be used to spell words if the puzzle pieces are placed side-by-side on a flat surface.

The present invention combines the play value of three-dimensional alphabetic blocks with the play value of two-dimensional word games. As is described and claimed below, the present invention provides three-dimensional alphabet letters that can mechanically interconnect to form words.

SUMMARY OF THE INVENTION

The present invention is a novelty game that utilizes a plurality of uniquely formed alphanumeric pieces. Each alphanumeric piece has a body shaped as either a letter of the alphabet or a number. The body has a flat face surface, a parallel rear surface, and side edges that interconnect the face surface to the rear surface. The width of the side edges is large enough to enable each letter piece to stand upright on-edge and unsupported.

A plurality of mechanical connectors are present on the alphanumeric pieces. The connectors enable each alphanumeric piece to physically interconnect with at least two others of the alphanumeric pieces to form a conjoined word or number sequence. When a conjoined word or number sequence is formed, only one or a few of the alphanumeric pieces touch the ground, depending upon a selected method of play. Most are supported in the air as the alphanumeric pieces build atop one another.

Using the alphanumeric pieces, words and number sequences can be formed. Word games can be played by adding new letters to a conjoined word and forming new words. Likewise, math games can be played by adding numbers to conjoined sequences of numbers. Play continues until the assemblage of alphanumeric pieces falls under the force of its own weight.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Although the present invention system can be embodied in many ways, the first embodiment illustrated shows the system employing only capitalized English alphabet letters. This embodiment is selected in order to set forth one of the best modes contemplated for the invention. The illustrated embodiment, however, is merely exemplary and should not be considered a limitation when interpreting the scope of the appended claims.

Figure 1:
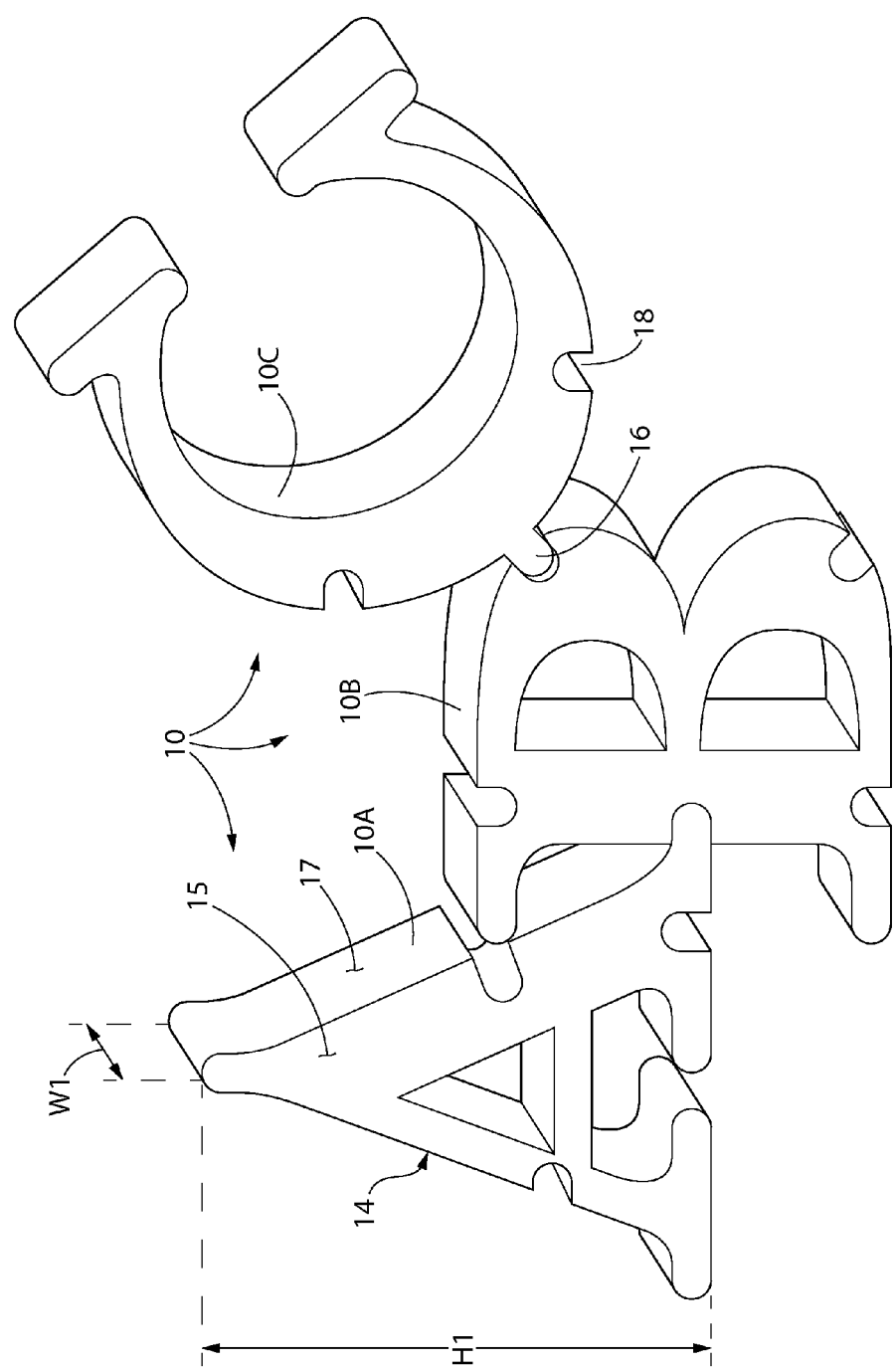
FIG. 1 is a perspective view of an exemplary embodiment of an assembly of three letter pieces.

Referring to FIG. 1, three letter pieces 10 are shown. The three letter pieces show the letters "A" 10a, "B" 10b and "C" 10c. It will be understood that three illustrated letter pieces 10 are exemplary of the twenty-six letters of the English alphabet and that a full set of letter pieces 10 would include twenty-six separate letter pieces.

Although each of the letter pieces 10 is shaped in the form of an alphabetic character, all of the letter pieces 10 embody certain common characteristics. Each of the letter pieces 10 has a body 14 with a common height H1. The body 14 of each of the letter pieces 10 also have a common width W1. The width W1 is preferably between one-fourth and one-third the size of the height H1. With the possible exceptions of the letters "O" and "U", the body 14 of each letter piece 10 preferably has a flat, or otherwise stable, bottom surface 12 that enables the letter pieces 10 to stand upright unassisted on a flat support surface. The stated ratio between the height H1 and width W1 of each letter piece 10 provides the body 14 of each letter piece 10 with a stable wide base. Accordingly, even top-heavy letter pieces, such as "P", "T", "F" and "Y" can stand upright without falling over.

The body 14 of each letter piece 10 in the illustration has a flat face surface 15 and an opposite flat rear surface (not shown) that extend in vertical planes when the letter piece 10 is standing upright. Side edges 17 join the face surface 15 to the rear surface, wherein the side edges 17 are perpendicular to the face surface 15 and the rear surface.

The body 14 of each letter piece 10 contains a mechanical connector that enables the different letter pieces 10 to be selectively connected together. The mechanical connectors join letter pieces together along the side edges 17. In this manner, when two letter pieces 10 are joined together, the face surface 15 and the rear surface of each of the letter pieces 10 remain in common parallel planes, respectively.

The mechanical connector shown includes both male protrusions 16 and female receptacles 18. The male protrusions 16 protrude out of the side edges 17, the female receptacles 18 are recessed in the side edges 17. The male protrusions 16 all have the same dimensions. Likewise, the female receptacles 18 also have the same dimensions. The various male protrusions 16 on all letter pieces 10 are sized to fit with the various female receptacles 18 on all letter pieces 10. It will be understood that mechanical connectors other than male protrusions and female receptacles can be used. Alternate mechanical connectors include, but are not limited to, magnetic connectors, snap-fit connectors and hook & loop connectors.

Figure 2:
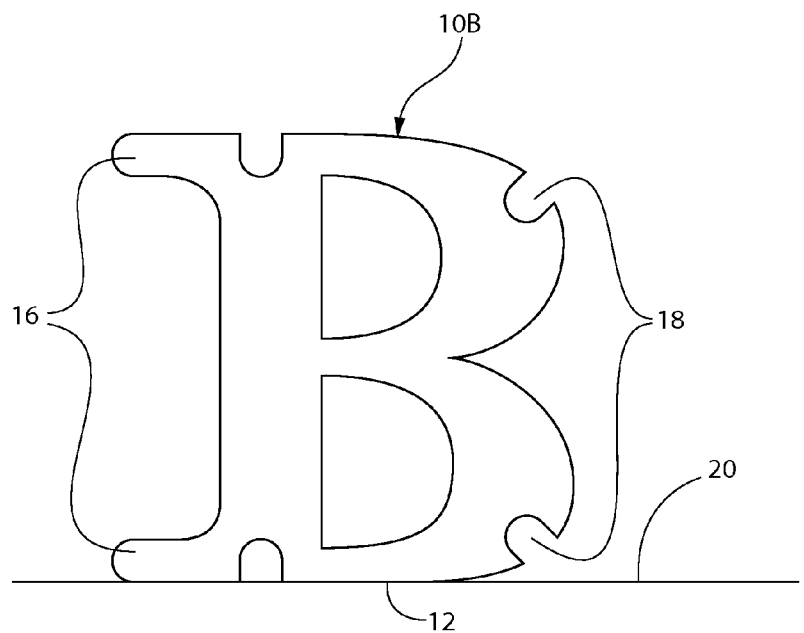
FIG. 2 is a front view of a single letter piece.

The body 14 of each illustrated letter piece 10 contains at least two male protrusions 16 and at least two female receptacles 18. The male protrusions 16 and female receptacles 18 are placed in one of three possible orientations. The orientations include a vertical orientation, a horizontal orientation, and an offset orientation. Although the offset can be in a wide range of angles, in the exemplary embodiment the offset is forty-five degrees between the vertical and horizontal on all letter pieces 10. Referring to FIG. 2, the letter piece "B" 10b is presented as an example. The letter piece 10b has a flat bottom surface 12 that enables the letter piece 10b to stand upright on a flat support surface 20. The letter piece 10b has two male protrusions 16 that extend rearwardly in the horizontal. It also has two female receptacles 18a that are oriented in the vertical. Lastly, it has two female receptacles 18b that are oriented at a forty-five degree offset between the vertical and horizontal.

Returning to FIG. 1, it will be understood that a collection of the letter pieces 10 is required for play. A full collection will contain at least every letter of the alphabet at least once. As is shown in FIG. 1, the various letter pieces can be interconnected by connecting male protrusions 16 with female receptacles 18. As a result, the letter pieces 10 can be interconnected to form any word. The letter pieces 10 can be interconnected in multiple configurations by utilizing differently positioned male protrusions 16 and female receptacles 18. As such, the same word made from the same interconnected letter pieces 10 can have different letter piece positions.

Figure 3:
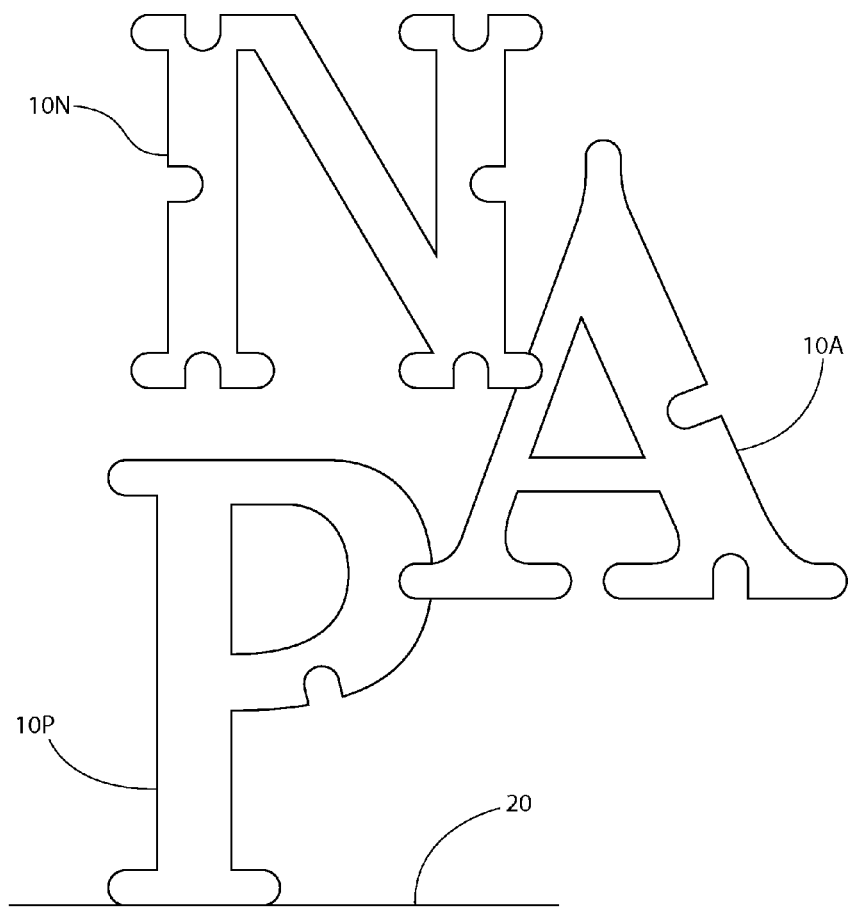
FIG. 3 is a front view of three letter pieces forming a word.

Using the letter pieces 10 of the present invention, word making games and tile games, such as Mahjong, can be played in three-dimensions. Referring to FIG. 3, a methodology of play for a word making game is explained.

Each player is provided with a random selection of letter pieces. As is shown in FIG. 3, a first player spells the word "PAN" by interconnecting three letter pieces 10p, 10a, 10n. The word is standing upright with letter piece 10p standing on the support surface 20. The letter pieces 10a and 10n are supported above the support surface 20 and does not touch the support surface 20.

Figure 4:
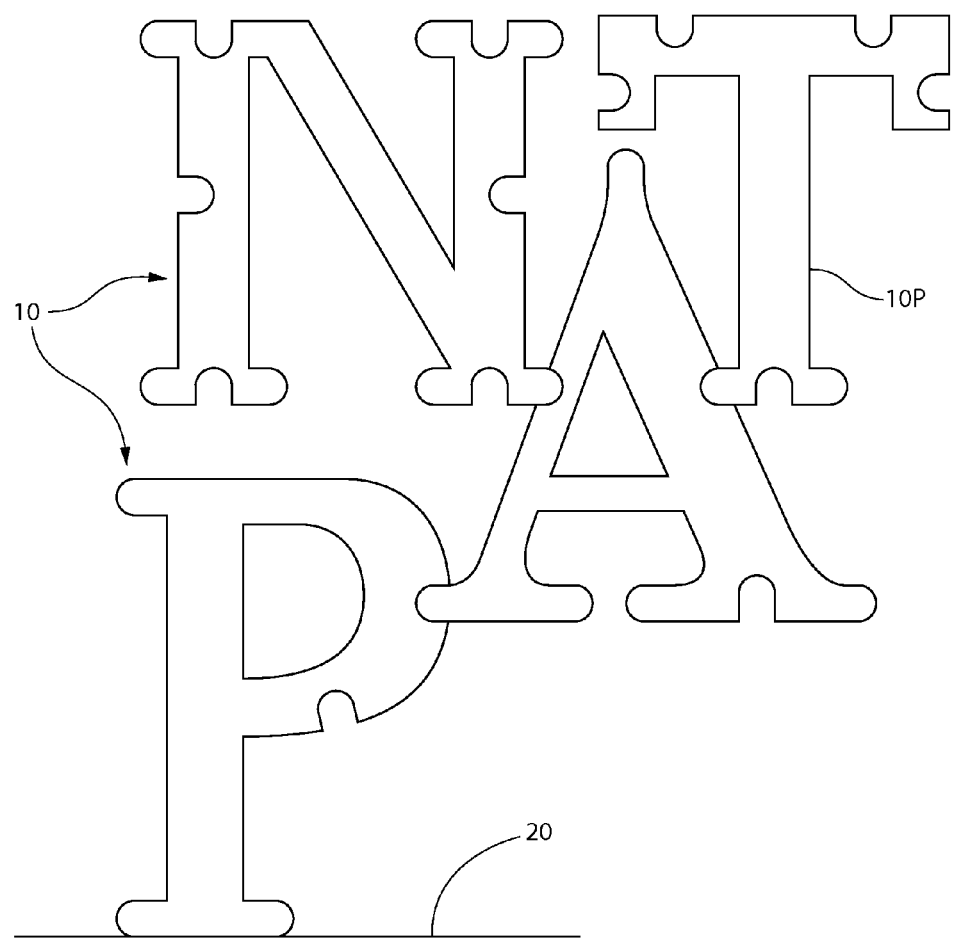
FIG. 4 is the same view as FIG. 3 with another letter added to form a second word.

Referring to FIG. 4, a second player can add a letter piece "T" 10t to the collection to spell both "PAT" and "TAN" as conjoined words. Because of the three-dimensional interconnecting characteristics of the letter pieces 10, letter pieces 10 can be added not only to the starting letter and the ending letter, but also to any letter in the middle of the word. Furthermore, as more and more letter pieces 10 are added to the assemblage, the assemblage becomes more and more top heavy. Eventually, the assemblage will become so top heavy that it will fall under the forces of its own weight. The game can therefore be played until the entire assemblage falls down. This adds new levels of both skill and challenge to the game. Not only can words be more easily made, but a player must calculate the size and position of the word so as not to topple the entire assemblage or cause any section of the assemblage to fall away.

Accordingly, to play the game, every player is provided with a letter piece 10. The first player places the letter piece upright on the support surface. Subsequent players add letters in an attempt to spell words. Play continues and points are accumulated until the entire assemblage falls.

Figure 5:
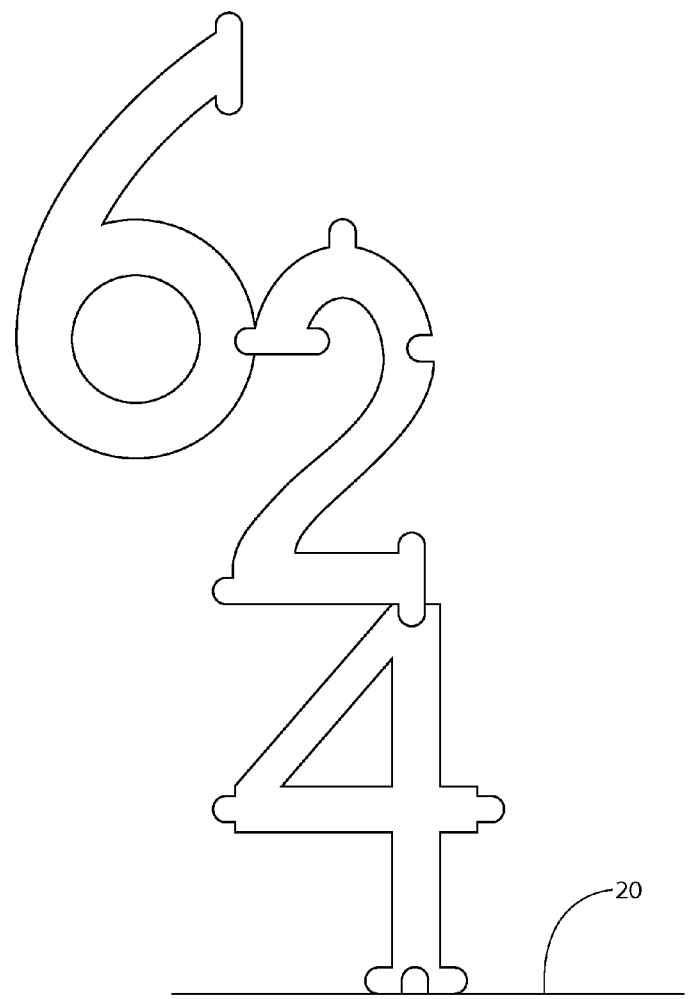
FIG. 5 is a front view of three number pieces forming a number sequence.

Referring now to FIG. 5, an alternate embodiment of the present invention is shown. In this embodiment, game pieces are numeric, not alphabetic. A first play may place a number piece "4" on a support surface 20. The next player can attach a "2" to the "4". The next player can earn points by attaching a "6" or a "2" to the assemblage because 4 plus 2 is 6 and 4 divided by 2 is 4. Numbers are added until the assemblage topples.

It will be understood that the embodiments of the present invention that are illustrated and described is merely exemplary and that a person skilled in the art can make many variations to that embodiment. For instance, non-alphanumeric characters, non-English letters, uncapitalized letters, and alphanumeric characters of many different fonts can be used in place of the letter and number pieces shown. All such embodiments are intended to be included within the scope of the present invention as defined by the claims.

What is claimed is:

1. A method of game play, comprising the steps of:
providing a plurality of playing pieces, wherein each of said playing pieces has a body shaped as a letter of an alphabet, and wherein said body of each of said playing pieces has a height, a width and a bottom surface that enables said body to stand unsupported upon said bottom surface;
standing a first of said playing pieces on a flat surface;
repeatedly connecting other of said playing pieces to said first of said playing pieces to form a word assemblage until said word assemblage falls down, wherein said other of said playing pieces are supported above the flat surface by said first of said playing pieces in said word assemblage prior to said word assemblage falling down; and
gathering game points depending upon said word assemblage.

2. The method according to claim 1, wherein said body of each of said playing pieces has a plurality of male protrusions extending outwardly from said body, and
a plurality of female receptacles extending inwardly into said body, wherein each of said female receptacles is sized to receive and interconnect with any of said male protrusions.

3. The method according to claim 2, wherein said body of each of said playing pieces has a flat face surface, a parallel rear surface and side edges of said width extending therebetween, wherein said bottom surface is one of said side edges.

4. The playing piece according to claim 1, wherein said width of said body is at least one quarter said height of said body.

5. The playing piece according to claim 3, wherein said male protrusions extend from said side edges in a plurality of directions.

6. The playing piece according to claim 5, wherein said female receptacles extend horizontally into said body in a plurality of directions.

7. A method of game play, comprising the steps of:
providing a plurality of playing pieces, wherein each of said playing pieces has an alphanumeric-shaped body with mechanical connectors formed thereon, and wherein said alphanumeric-shaped body of each of said playing pieces has a height, a width and a bottom surface that enables said alphanumeric-shaped body to stand unsupported upon said bottom surface; and
sequentially adding at least some of said playing pieces together to form an assemblage until said assemblage falls down, wherein at least one of said playing pieces rests on a supporting surface and others of said playing pieces are supported above said supporting surface by said mechanical connectors without touching said supporting surface prior to said assemblage falling down.

8. The game according to claim 7, wherein each of said playing pieces has a common height and a common width, wherein said common width is no less than one-quarter said common height.

9. The method according to claim 7, wherein said playing pieces are formed as letters of an alphabet.

10. The method according to claim 9 further including the step of forming said assemblage into a word, wherein said word has a word size.

11. The method according to claim 10, further including the step of earning points depending upon said word size.

12. The method according to claim 7, wherein each of said letter pieces has side edges and said step of interconnecting at least some of said playing pieces together includes interconnecting said side edges.

13. The method according to claim 7, wherein said playing pieces are used to create words.

14. The method according to claim 7, wherein said playing pieces are formed as numbers.

15. The method according to claim 14, further including the step of forming said assemblage into a numerical expressions.

16. A method of game play, comprising the steps of:
providing a plurality of playing pieces, wherein each of said playing pieces has a body shaped as a number, and wherein said body of each of said playing pieces has a height, a width and a bottom surface that enables said body to stand unsupported upon said bottom surface;
standing a first of said playing pieces on a flat surface;
repeatedly connecting other of said playing pieces to said first of said playing pieces to form a numerical expression until said numerical expression falls down, wherein said other of said playing pieces are supported above the flat surface by said first of said playing pieces in said numerical expression prior to said numerical expression falling down; and
gathering game points depending upon said numerical expression.

17. The method according to claim 16, wherein said body of each of said playing pieces has a plurality of male protrusions extending outwardly from said body, and
a plurality of female receptacles extending inwardly into said body, wherein each of said female receptacles is sized to receive and interconnect with any of said male protrusions.

* * * * *